United States Patent [19]

Marchino

[11] Patent Number: 5,022,709
[45] Date of Patent: Jun. 11, 1991

[54] SPRINGING AND WRAP-AROUND ELEMENT FOR A SEAT AND/OR BACKREST, AND SEAT EMBODYING THE SAME

[76] Inventor: Piero Marchino, MC 98000, 6 Avenue des Citronniers, Monaco, Italy

[21] Appl. No.: 310,219

[22] Filed: Feb. 13, 1989

[30] Foreign Application Priority Data

Feb. 12, 1988 [IT] Italy ................................ 67105 A/88

[51] Int. Cl.⁵ .............................................. A47C 7/02
[52] U.S. Cl. ................................... 297/452; 297/459; 297/460; 297/284
[58] Field of Search ............... 297/452, 459, 458, 460, 297/292, 284

[56] References Cited

U.S. PATENT DOCUMENTS

| | | | |
|---|---|---|---|
| 3,393,012 | 7/1968 | Chancellor, Jr. | 297/458 |
| 4,153,293 | 5/1979 | Sheldon | 297/460 |
| 4,368,917 | 1/1983 | Urai | 297/458 |
| 4,500,136 | 2/1985 | Murphy et al. | 297/458 |
| 4,542,887 | 9/1985 | Bethell et al. | 297/452 |
| 4,627,661 | 12/1986 | Ronnhult et al. | 297/284 |
| 4,632,454 | 12/1986 | Naert | 297/460 |
| 4,636,000 | 1/1987 | Nishino | 297/458 |

FOREIGN PATENT DOCUMENTS

| | | |
|---|---|---|
| 2023803 | 12/1971 | Fed. Rep. of Germany . |
| 3045809 | 7/1982 | Fed. Rep. of Germany . |
| 3619188 | 12/1987 | Fed. Rep. of Germany . |
| 3620084 | 12/1987 | Fed. Rep. of Germany . |
| 3707926 | 9/1988 | Fed. Rep. of Germany . |

*Primary Examiner*—Kenneth J. Dorner
*Assistant Examiner*—Brian K. Green
*Attorney, Agent, or Firm*—Klauber & Jackson

[57] ABSTRACT

A springing and wrap-around element for a seat and/or backrest, comprising a pair of lateral supporting means, and a flexible blade consisting of a convex central portion and two side walls extending obliquely outwards from the central portion and secured to respective supporting means via hinge connecting means; and a seat embodying such an element.

27 Claims, 6 Drawing Sheets

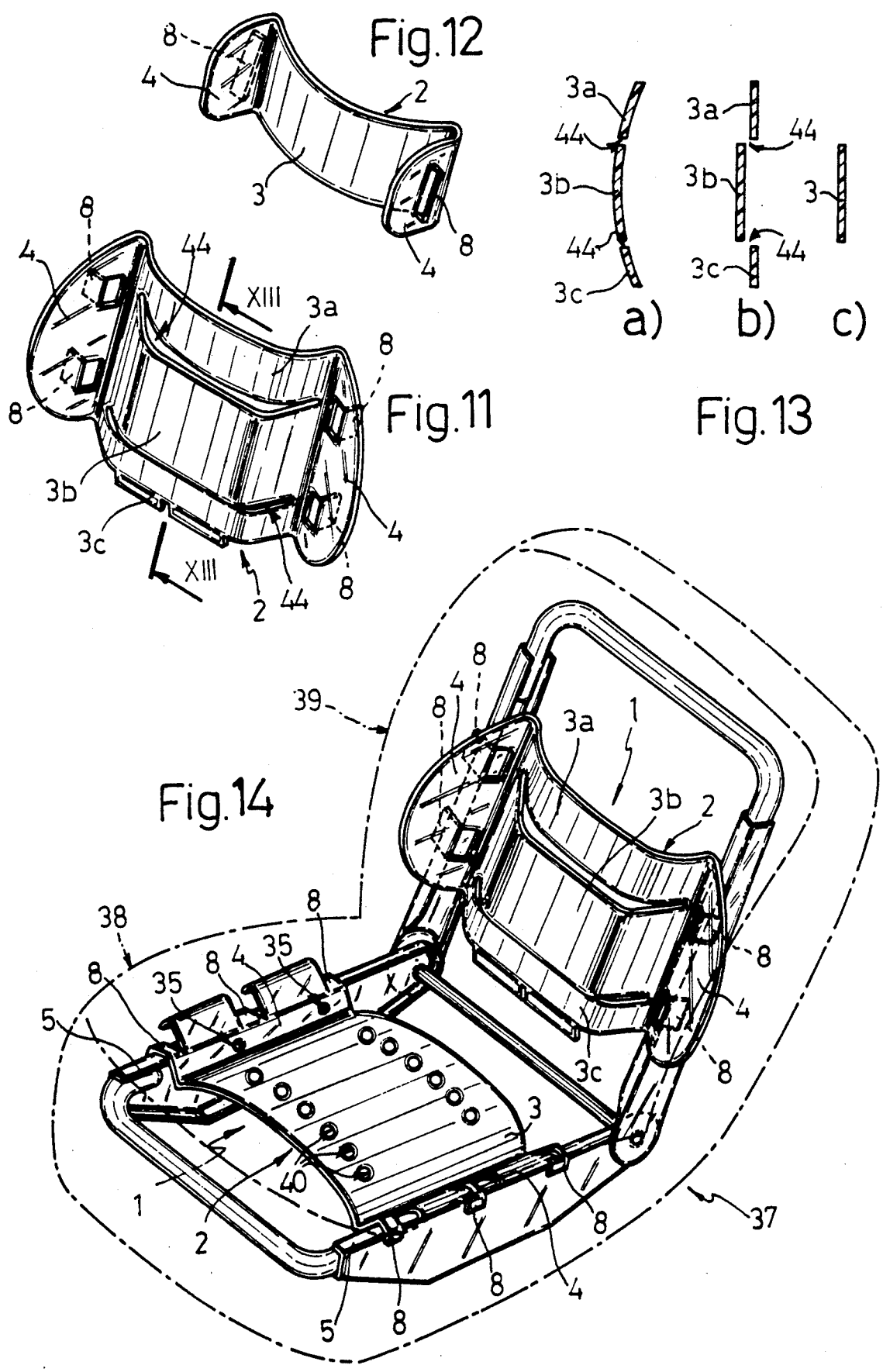

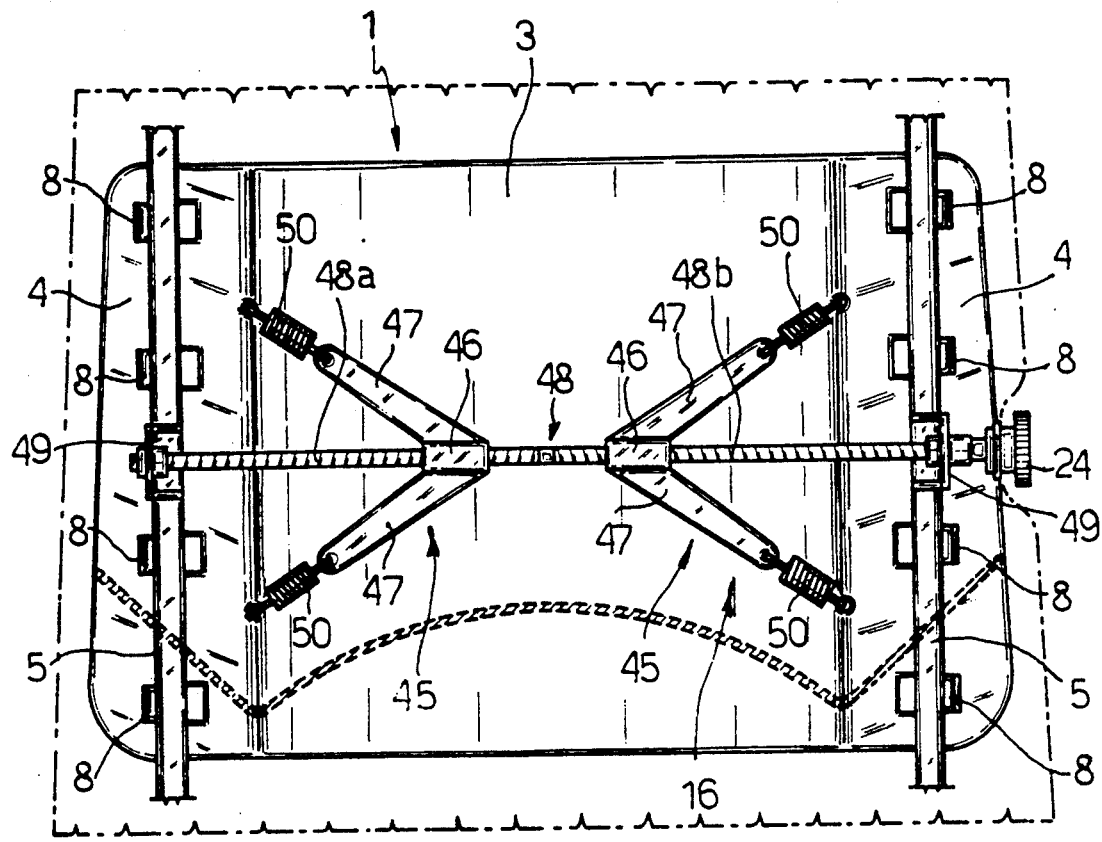
Fig. 15
Fig. 16
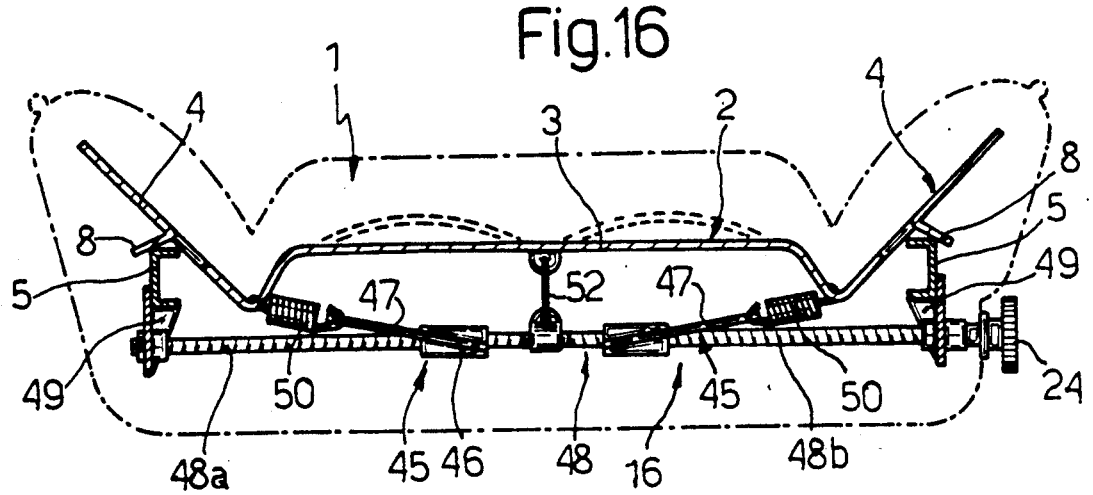

SPRINGING AND WRAP-AROUND ELEMENT FOR A SEAT AND/OR BACKREST, AND SEAT EMBODYING THE SAME

BACKGROUND OF THE INVENTION

The present invention relates to a springing and wrap-around element for a seat, particularly but not exclusively a vehicle seat, and to a seat embodying the same.

Increasing emphasis is being placed by automobile designers on vehicle components designed to ensure maximum comfort of both passengers and drivers. Of these, one of the most important is undoubtedly the upholstery, the comfort of which provides, not only for eliminating travel fatigue, but also for a substantial improvement in safety by ensuring maximum concentration of the driver at all times. Automobile seats are therefore usually fitted with springing elements housed underneath the seat padding, which is designed to "wrap around" the body, and so prevent the occupant from being swung from side to side when cornering, particularly at high speed.

Known seats of this type usually present two major drawbacks: fairly limited wrap-around effect, and high-cost on-line assembly of the seat components.

SUMMARY OF THE INVENTION

The aim of the present invention is to provide a springing and wrap-around element for a seat, and a seat embodying the same, designed to overcome the aforementioned drawbacks typically associated with known types of seats.

With this aim in view, according to the present invention, there is provided a springing and wrap-around element for a seat and/or backrest, characterized by the fact that it comprises a pair of supporting means, and a flexible blade secured to said supporting means; said flexible blade comprising a convex central portion facing the load-receiving direction of said element, and two side walls extending outwards from said central portion and also facing said direction; said side walls being secured centrally to said supporting means via connecting means forming, at least approximately, a hinge.

The present invention also relates to a seat, particularly an automobile seat, comprising a frame, and upholstery consisting of springing and wrap-around means, padding means, and covering means; characterized by the fact that said springing and wrap-around means comprise at least a flexible blade secured to said frame; said flexible blade comprising a convex central portion and two side walls extending obliquely outwards from said central portion; said side walls being secured centrally to said frame via connecting means forming, at least approximately, a hinge.

BRIEF DESCRIPTION OF THE DRAWINGS

A number of non-limiting embodiments of the present invention will be described by way of examples with reference to the accompanying drawings, in which:

FIGS. 11 and 12 show views in perspective of further embodiments of the element according to the present invention;

FIGS. 13a and 13b show sections of respective variations of the FIG. 11 element along line XIII—XIII in FIG. 11;

FIG. 13c shows a section of the FIG. 12 element;

FIG. 14 shows a partial view in perspective of an automobile seat featuring a pair of elements according to the present invention;

FIG. 15 shows a bottom plan view of a further embodiment of the element according to the present invention;

FIG. 16 shows a section of a variation of the FIG. 15 element;

DETAILED DESCRIPTION OF THE INVENTION

Figure 1:
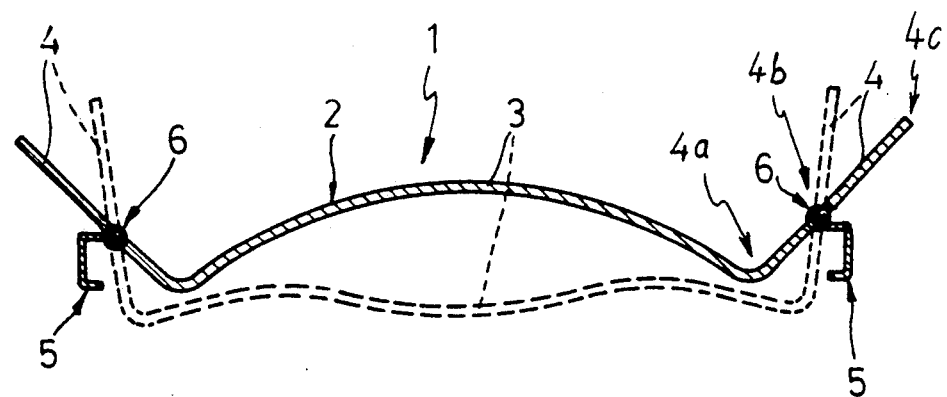
FIG. 1 shows a schematic section of a springing and wrap-around element for an automobile seat, in accordance with the present invention.

Number 1 in FIG. 1 indicates a springing and wrap-around element in accordance with the present invention, and hereinafter referred to simply as the "element". Said element 1 comprises a flexible blade 2 consisting of an arched, convex central portion 3 facing the load-receiving direction of element 1, and a pair of substantially flat side walls 4 extending integrally outwards from said central portion 3 and also facing said load-receiving direction. Close to their respective transverse center lines, side walls 4 are secured to respective supporting bars 5 forming, for example, part of an automobile seat frame. Connection of side walls 4 to supporting bars 5 is shown schematically in FIG. 1 in the form of hinges 6. It should be made clear, however, that said hinges 6 are not meant to indicate a hinge in the strictly mechanical sense, but may be formed or approximated, designwise, in any convenient manner as described hereinafter. Each side wall has a rear portion (4a) connected to the central portion (3) of the blade (2), an intermediate portion (4b), and a front portion (4c).

Element 1 operates as follows.

When a load (the weight of the occupant) is applied on central portion 3 of blade 2, this flexes so as to flatten central portion 3 as shown by the dotted line in FIG. 1. The ends of central portion 3 therefore move outwards, thus causing side walls 4 to pivot about respective hinges 6 and so produce the required wrap-around effect.

Figure 2:
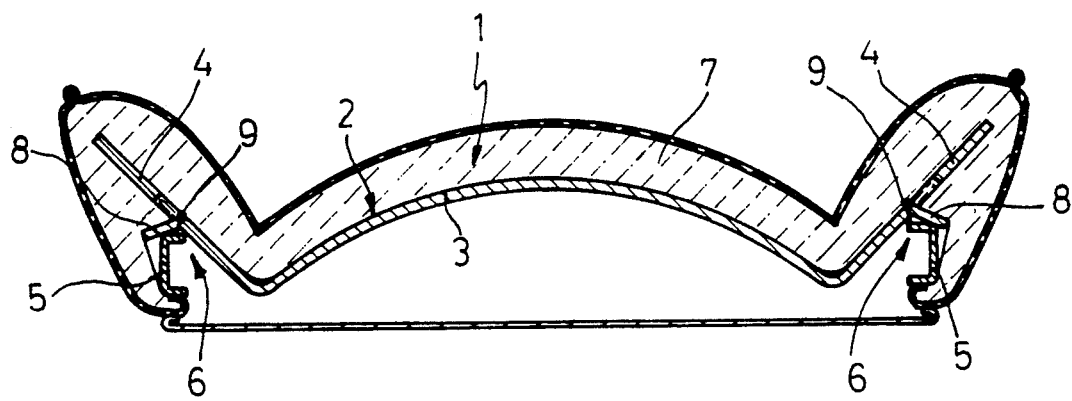
FIGS. 2 to 5 show respective schematic sections of further embodiments of the element according to the present invention.

FIGS. 2 to 18 show alternative embodiments of element 1, the component parts of which are indicated, wherever possible, using the same numbering system as in FIG. 1. In FIG. 2, element 1 is housed in the padding 7 of an automobile seat backrest, and hinges 6 consist of flat outer tabs 8 on walls 4. Said tabs 8 and walls 4 cooperate respectively with opposite edges of front face 9 of a respective supporting bar 5, for ensuring firm connecttion of blade 2 and bars 5.

Figure 3:
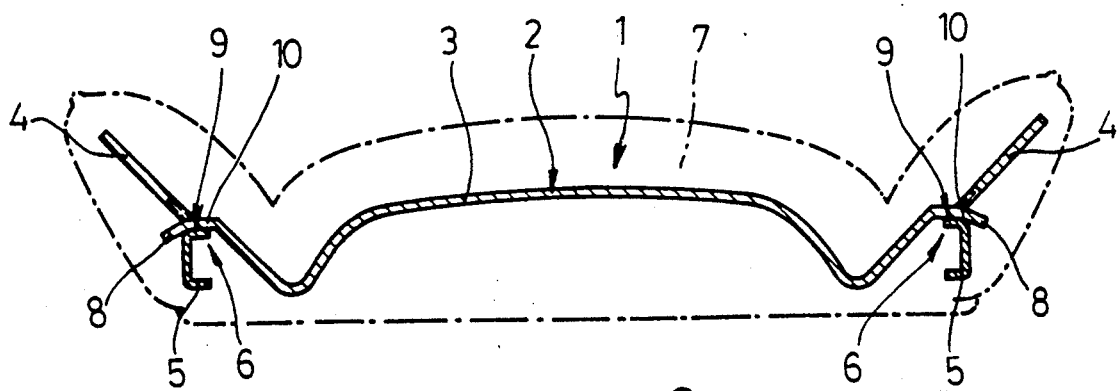

In FIG. 3, instead of being flat, walls 4 present a flat longitudinal rib or shaped center portion 10 substantially parallel to, and cooperating with, front face 9 of respective supporting bar 5. In this case, tabs 8 extend obliquely from rib 10.

Figure 4:
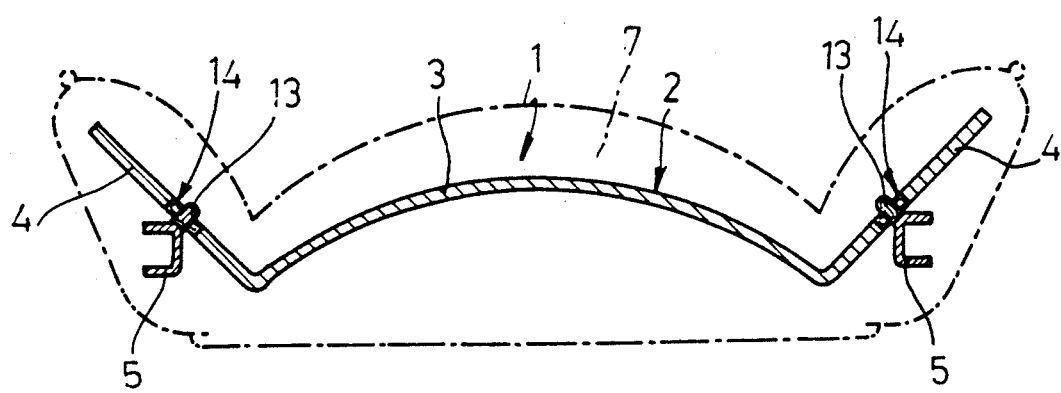

In FIG. 4, hinges 6 consist of pins 13 integral with bars 5, having their respective axes substantially perpendicular to the plane of respective walls 4, and engaging respective through openings 14 in the same.

Figure 5:
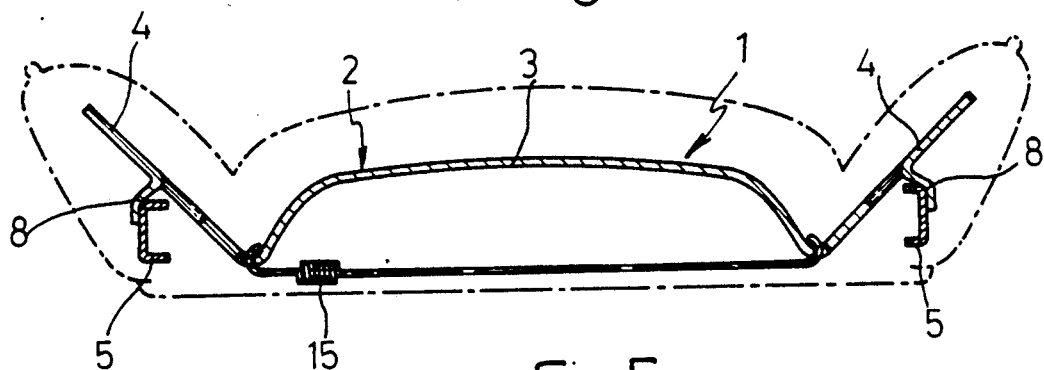
Figure 6:
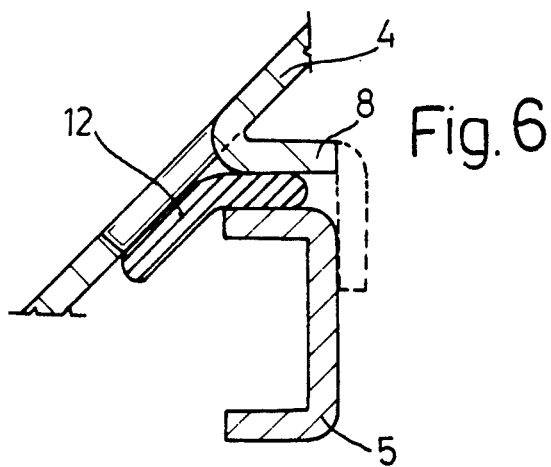
FIG. 6 shows a larger-scale detail of a variation of the FIG. 5 element.

The FIG. 5 embodiment, relative to the seat portion of an automobile seat, is substantially similar to that of FIG. 2, except that blade 2 is stiffened by one or more helical springs 15 stretched between the opposite ends of central portion 3 of blade 2, and the end portions of tabs 8 are bent downwards for ensuring firmer connection to respective bars 5.

The embodiments of element 1 described herein may all comprise two shims 12 (FIG. 6) conveniently formed from elastomeric material and inserted between tabs 8 and bars 5, for eliminating creaking when said parts contact under load.

Figure 7:
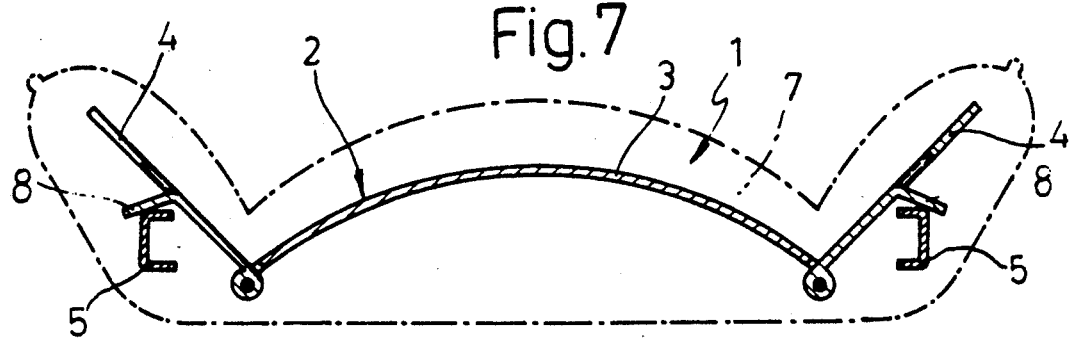
FIGS. 7 to 10 show respective schematic sections of further embodiments of the element according to the present invention.

Element 1 in FIG. 7 differs from the FIG. 2 element by virtue of walls 4 being hinged to, instead of integral with, portion 3.

Figure 8:
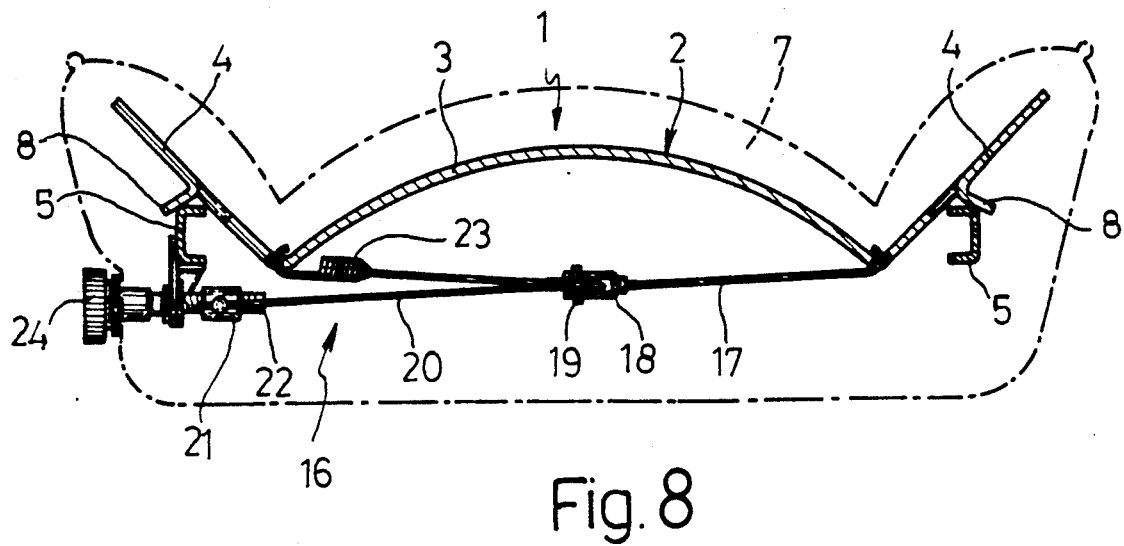

Element 1 in FIG. 8 presents a rigidity adjusting device 16 comprising a first tie 17 secured at one end to one end of central portion 3 of blade 2, and, at the other end, to a supporting element 18 for a pulley 19. Device 16 also comprises a second tie 20 wound about pulley 19 and secured at one end to the opposite end of central portion 3 of blade 2, and, at the other end, to a nut screw 21 screwed on to a threaded rod 22. Said second tie 20 comprises a helical spring 23 adjustable in tension by means of a hand-operated knob 24 integral with threaded rod 22.

Figure 9:
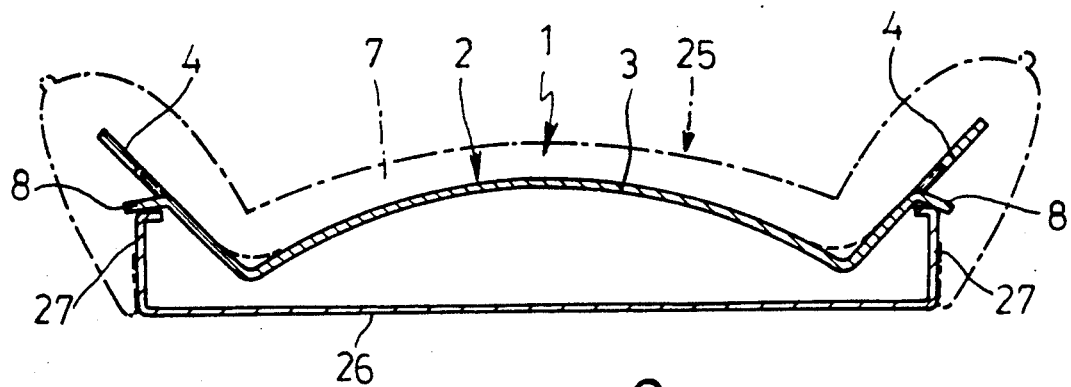

Element 1 in FIG. 9 is housed inside a cushion 25 for the seat portion and/or backrest of an automobile or any other type of seat. Cushion 25 comprises a flat, substantially rigid back 26 defining, at its lateral ends, two supporting ribs 27 designed to perform the same function as bars 5. Blade 2 is identical to that of the FIG. 2 element, and is housed inside padding 7 of cushion 25.

Figure 10:
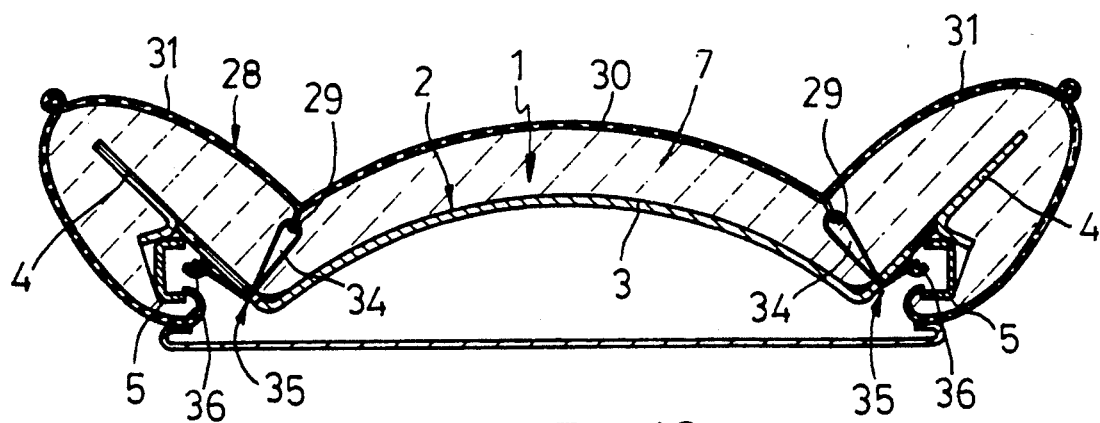

Element 1 in FIG. 10 is housed inside a seat featuring padding 7 and cover 28. On the underside of cover 28, there are provided two substantially parallel metal wires or "veins" 29 designed to keep cover 28 taut by separating central portion 30 from wrap-around portions 31. Said metal wires 29 are connected to side walls 4 of blade 2 by means of elastic cords 34 threaded through respective holes in padding 7 (not shown) and respective holes 35 in walls 4, and hooked on to respective projections 36 on the outer side of walls 4.

FIGS. 11, 13a and 13b show further embodiments of blade 2, wherein central portion 3 is divided into three longitudinal sections 3a, 3b, 3c by a pair of substantially parallel slits 44. Said sections 3a, 3b, 3c may be such as to form a single curved surface (FIG. 13a), or they may be flat with a projecting middle section 3b (FIG. 13b) so as to form an elastic system of variable rigidity.

FIGS. 12 and 13c show a further embodiment of blade 2, wherein central portion 3 presents a single convex section.

FIG. 14 shows an automobile seat 37 comprising two springing and wrap-around elements 1 applied respectively to the seat portion 38 and backrest 39.

Element 1 of seat portion 38 comprises a number of holes 40 in central portion 3 of blade 2, for enabling passage of the padding material (not shown) at the foaming stage. Each wall 4 of blades 2 comprises two or more lateral tabs 8 securing it to bars 5 of the seat frame. It will be noted that tabs 8 of the backrest element 1 are conveniently of the type shown in FIG. 2, whereas those of the seat portion element 1 are preferably of the type shown in FIG. 5, for ensuring lateral connection of blade 2 to supporting bars 5. Also shown are holes 35 for threading through elastic cords 34 (not shown).

Element 1 in FIG. 15 differs from the FIG. 8 element as regards rigidity adjusting device 16, which, in this case, comprises a pair of substantially V-shaped elements 45, each having a tubular threaded central portion 46, and a pair of inclined arms 47. Portions 46 are screwed to respective opposite-threaded sections 48a, 48b of a screw 48 fitted across element 1, supported at the ends in angularly-free manner by supports 49 integral with bars 5, and turned by end knob 24. Arms 47 slope outwards of element 1, and are connected at the ends to respective springs 50 secured to the lateral ends of central portion 3 of blade 2.

Element 1 in FIG. 16 is identical to the FIG. 15 element, except that provision is made for a connecting element 52, e.g. made of metal wire, between the center point of central portion 3 of blade 2 and the center portion of screw 48.

Figure 17:
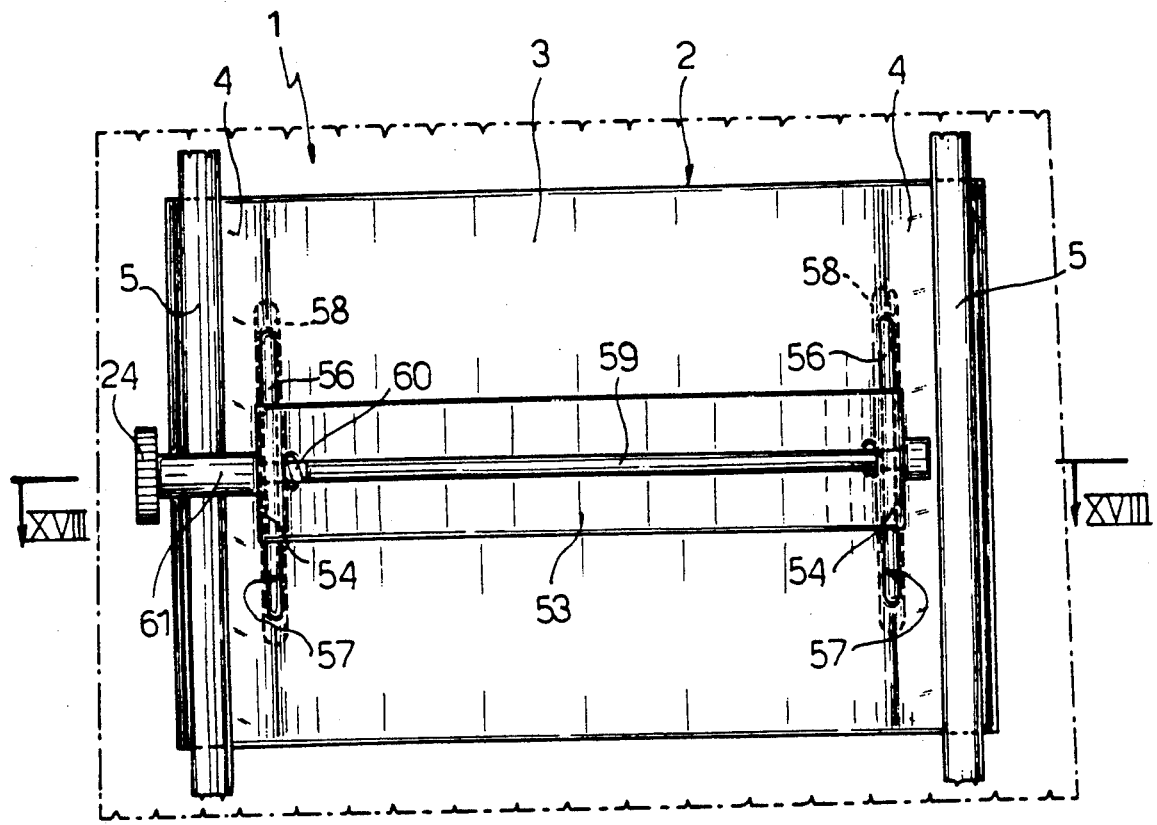
FIG. 17 shows a bottom plan view of a further embodiment of the element according to the present invention.
Figure 18:
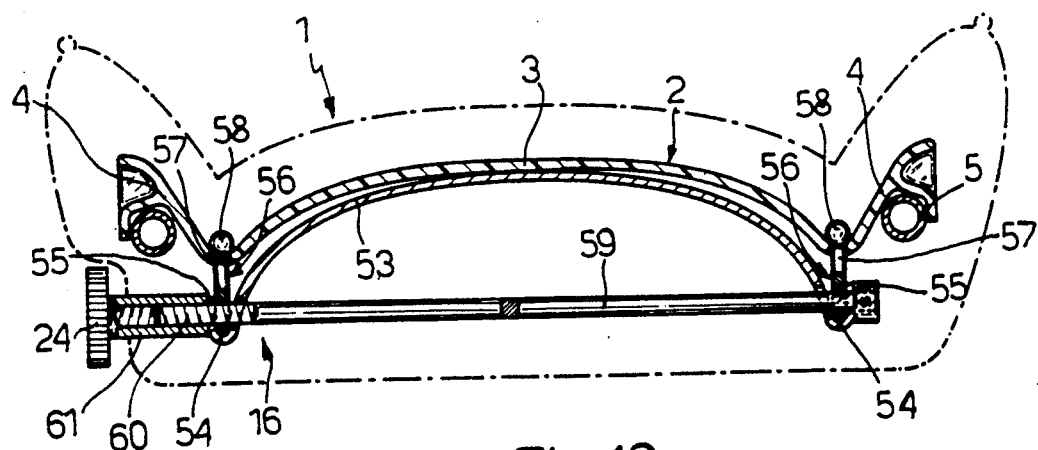
FIG. 18 shows a section along line XVIII—XVIII in FIG. 17.

Element 1 in FIGS. 17 and 18 presents a further embodiment of rigidity adjusting device 16, especially suitable for assembly on the seat portion.

Said device 16 comprises a leaf spring 53 consisting of a curved steel strip resting on the underside of central portion 3 of blade 2, and having upturned ends 54 defining respective seats 55 supporting respective elements 56 connecting blade 2.

In more detail, said connecting elements consist of plates inserted inside respective openings 57 formed between central portion 3 and side walls 4 of blade 2, and secured inside the same by respective upper cylindrical stop projections 58.

Plates 56 and ends 54 of spring 53 are drilled for housing, prismatically at least on one side, a square-section bar 59 having a threaded end 60 engaging a threaded coupling 61 integral with a regulating knob 24 and supported in angularly-free, axially-fixed manner in any convenient way (not shown).

Elements 1 according to the present invention and as shown in FIGS. 2 to 18 operate in exactly the same way as described in connection with FIG. 1. It will be noted that spring 15 in FIG. 5 provides for stiffening blade 2, which function is provided for in FIG. 8 by spring 23, the tension of which is regulated by knob 24.

In the case of a blade 2 as shown in FIG. 11, manual rigidity adjustment may conveniently be limited to middle section 3b.

As regards the FIG. 15 element, rotation of knob 24, one way or the other, causes elements 45 to move away or towards each other, thus increasing or reducing the tension of springs 50.

Connecting element 52 in FIG. 16 provides for securing the center of central portion 3 of blade 2, to prevent it from overflexing, and so impairing seating comfort, subsequent to an increase in the tension of springs 50.

Finally, knob 24 on the FIGS. 17 and 18 element provides for moving ends 54 of spring 53 towards or away from each other, so as to increase or reduce the load exerted on central portion 3 of blade 2.

The advantages of elements 1 according to the present invention will be clear from the foregoing description. Firstly, by virtue of the connection between side walls 4 and supporting bars 5, blade 2 provides for highly effective wrap-around performance and, consequently, a considerable increase in comfort. Moreover, a springing and wrap-around element of the type described enables off-line pre-upholstering of the seat. That is, the padding, covering and relative accessory components may be assembled on blade 2, e.g. as shown in FIG. 10, which may then be fitted to the seat frame on the vehicle assembly line. This provides for obvious cost cutting, by virtue of reducing assembly time, as well as bench pre-assembly cost per hour as compared with on-line assembly.

The FIG. 10 assembly solution is particularly attractive by virtue of keeping the cover stretched tightly over the seat.

To those skilled in the art it will be clear that changes may be made to elements 1 and seat 37 as described and illustrated herein without, however, departing from the scope of the present invention. In particular, element 1 may be applied to any type of seat or cushion, other than automobile types, and may combine any of the features described herein. Also, elastic cords 34 may be secured to walls 4 in any convenient manner, e.g. wound about the same.

I claim:

1. A springing and wrap-around device for a seat cushion and seat backrest, comprising:
   (a) a pair of fixed supports;
   (b) a flexible blade mounted on said supports, said flexible blade including
      (i) a central portion which is curved in a convex manner towards a load receiving direction of said device, and
      (ii) two side walls extending outwardly from said central portion towards the load receiving direction, each said side wall having
         (A) a rear portion connected to the central portion of said blade,
         (B) an intermediate portion, and
         (C) a front portion, and
      (iii) said central portion defining elastically deformable means for moving apart said rear portions of said side walls and for rotating inwardly said front portions of said side walls, and
   (c) pivot mounting means for pivotally mounting each said intermediate portion with respect to one said fixed support so that the central portion moves apart the rear portions of the side walls and rotates inwardly the front portions of the side walls, in response to a load applied to the central portion.

2. A springing and wrap-around device according to claim 1, wherein said pivot mounting means pivotally secures each said intermediate portion to a respective fixed support.

3. A springing and wrap-around device according to claim 1, wherein said pivot mounting means includes at least two tab means projecting laterally from said intermediate portions of said side walls of said flexible blade for cooperating with said fixed supports so as to pivotally mount each said intermediate portion with respect to one said fixed support.

4. A springing and wrap-around device according to claim 1, wherein said pivot mounting means includes shaped center portion means connected with said intermediate portions of said flexible blade for cooperating with said fixed supports so as to pivotally mount each said intermediate portion with respect to one said fixed support.

5. A springing and wrap-around device according to claim 4, wherein said central portion of said flexible blade is comprised of a plurality of adjacent sections.

6. A springing and wrap-around device according to claim 5, wherein said adjacent sections of said central portion are of differing rigidity.

7. A springing and wrap-around device according to claim 1, further comprising elastic means secured to ends of said central portion of said flexible blade for increasing the rigidity of said central portion.

8. A springing and wrap-around device according to claim 7, wherein said elastic means includes at least one helical spring.

9. A springing and wrap-around device according to claim 7, wherein said elastic means includes at least one leaf spring cooperating with said central portion of said flexible blade.

10. A springing and wrap-around device according to claim 7, further comprising means for adjusting the tension of said elastic means.

11. A springing and wrap-around device according to claim 10, wherein said means for adjusting includes screw-nut assembly means for adjusting the tension on said elastic means and hand-operated knob means for controlling said screw-nut assembly means.

12. A springing and wrap-around device according to claim 1, wherein said pair of fixed supports is comprised of a pair of bars forming a part of a frame of an automobile seat.

13. A springing and wrap-around device according to claim 1, wherein said pair of fixed supports form part of a frame of a cushion.

14. A seat comprising:
   (a) a frame; and
   (b) upholstery including a springing and wrap-around device, padding thereon and a covering, said springing and wrap-around device including:
      (i) a flexible blade mounted on said frame, said flexible blade including:
         (A) a central portion which is curved in a convex manner towards a load receiving direction of said device, and
         (B) two side walls extending outwardly from said central portion towards the load receiving direction, each said side wall having a rear portion connected to the central portion of said blade, an intermediate portion and a front portion, and
         (C) said central portion defining elastically deformable means for moving apart said rear portions of said side walls and for rotating inwardly said front portions of said side walls, and
      (ii) pivot mounting means for pivotally mounting each said intermediate portion with respect to said frame so that the central portion moves apart the rear portions of the side walls and rotates inwardly the front portions of the side walls, in response to a load applied to the central portion.

15. A seat according to claim 14, wherein said upholstery is pre-assembled and subsequently connected to said frame.

16. A seat according to claim 14, further including connecting element means secured to said side walls of said flexible blade for connecting said padding and said covering to said flexible blade.

17. A seat according to claim 16, wherein said covering includes metal wire veins integral therewith, said padding includes openings therethrough and said connecting element means includes a plurality of elastic cords secured to said metal wire veins and threaded through respective openings in said padding and secured to said side walls.

18. A seat according to claim 17, wherein said side walls include a plurality of projections on which said elastic cords are hooked.

19. A seat according to claim 14, wherein said pivot mounting means includes at least two tab means projecting laterally from the intermediate portion of said side walls of said flexible blade for cooperating with said frame so as to pivotally mount each said intermediate portion with respect to one said fixed support.

20. A seat according to claim 14, wherein said pivot mounting means includes shaped center portion means connected with said intermediate portions of said side walls for cooperating with said frame to pivotally mount each said intermediate portion with respect to said frame.

21. A seat according to claim 14, further comprising elastic means secured to ends of said central portion of said flexible blade for increasing the rigidity of said central portion.

22. A seat according to claim 21, wherein said elastic means includes at least one helical spring.

23. A seat according to claim 21, wherein said elastic means includes at least one leaf spring cooperating with said central portion of said flexible blade.

24. A seat according to claim 21, further including means for adjusting the tension of said elastic means.

25. A seat according to claim 24, wherein said means for adjusting includes screw-nut assembly means for adjusting the tension on said elastic means and hand-operated knob means for controlling said screw-nut assembly means.

26. A seat according to claim 14, wherein said central portion of said flexible blade is comprised of a plurality of adjacent flat sections.

27. A seat according to claim 14, wherein said central portion of said flexible blade is comprised of a plurality of adjacent convex sections.

* * * * *

UNITED STATES PATENT AND TRADEMARK OFFICE
CERTIFICATE OF CORRECTION

PATENT NO. : 5,022,709
DATED : June 11, 1991
INVENTOR(S) : Piero Marchino

It is certified that error appears in the above-indentified patent and that said Letters Patent is hereby corrected as shown below:

On the title page, Item [76]: please delete the word "Italy".

Signed and Sealed this

Second Day of November, 1993

Attest:

BRUCE LEHMAN

*Attesting Officer*                    *Commissioner of Patents and Trademarks*